US009942241B2

(12) United States Patent
Lee

(10) Patent No.: US 9,942,241 B2
(45) Date of Patent: Apr. 10, 2018

(54) IDENTITY SWITCHING METHOD AND ASSOCIATED SERVER FOR IMPROVING SYSTEM SECURITY

(71) Applicant: Synology Incorporated, Taipei (TW)

(72) Inventor: Yi-Chien Lee, Taipei (TW)

(73) Assignee: Synology Incorporated, Taipei (TW)

( * ) Notice: Subject to any disclaimer, the term of this patent is extended or adjusted under 35 U.S.C. 154(b) by 171 days.

(21) Appl. No.: 15/005,020

(22) Filed: Jan. 25, 2016

(65) Prior Publication Data

US 2016/0294841 A1    Oct. 6, 2016

(30) Foreign Application Priority Data

Apr. 1, 2015   (TW) .............................. 104110712 A

(51) Int. Cl.
*H04L 29/06*        (2006.01)
*G06F 21/62*        (2013.01)

(52) U.S. Cl.
CPC ........ *H04L 63/105* (2013.01); *G06F 21/6218* (2013.01)

(58) Field of Classification Search
None
See application file for complete search history.

(56) References Cited

U.S. PATENT DOCUMENTS

| 6,308,275 | B1  | 10/2001 | Vaswani |
| 2002/0078365 | A1* | 6/2002 | Burnett .................. G06F 21/31 726/26 |
| 2006/0242422 | A1  | 10/2006 | Hong |
| 2006/0265597 | A1* | 11/2006 | Carey ..................... G06F 21/62 713/182 |

FOREIGN PATENT DOCUMENTS

| TW | 200915818 | 4/2009 |
| TW | 200941996 | 10/2009 |
| TW | 201423467 | 6/2014 |

OTHER PUBLICATIONS

"Linux account and identity management", internet article, last updated on Feb. 10, 2003, URL: http://linux.vbird.org/linux_basic/0410accountmanager/0410accountmanager.php. Recognize UID, GID, SUID, SGID and / etc/passwd file, /etc/shadow file.

* cited by examiner

*Primary Examiner* — William J. Goodchild
(74) *Attorney, Agent, or Firm* — Winston Hsu

(57) ABSTRACT

A server includes a processor and a storage unit. The storage unit stores a program code, and when the program code is executed by the processor, the processor executes the following steps: when receiving an operation request from outside the server, if an effective identity (ID) code of a worker executing the operation request is set to be a default ID code and the default ID code does not have an authority for executing the operation request, setting the effective ID code as a specific ID code, and executing the operation request through the worker having the specific ID code, wherein the specific ID code has the authority for executing the operation request; and after the operation request is executed, setting the effective ID code as the default ID code.

14 Claims, 2 Drawing Sheets

400
IDENTITY SWITCHING METHOD AND ASSOCIATED SERVER FOR IMPROVING SYSTEM SECURITY

BACKGROUND OF THE INVENTION

1. Field of the Invention

The present invention relates to a server, and more particularly, to a server capable of switching execution identities (ID codes) to execute an operation request.

2. Description of the Prior Art

In a multi-functional network-attached storage server having a web server or a file server, the execution ID code which has the highest system management authority is utilized to enable an HTTPd server software and the operation request of the server. Since this execution ID includes the highest authority, when the common gateway interface (CGI) of the operating system has bugs or there are defects in some system elements, the system control authority may be obtained when the execution ID code is executed by the HTTPd server software, thus endangering the security of the operating system.

SUMMARY OF THE INVENTION

An objective of the present invention is therefore to provide a method and an associated server for switching execution identities, wherein the authority is temporarily privileged only when necessary, thus solving the problems existing in prior arts.

According to an embodiment of the present invention, a server is provided. The server comprises a processor and a storage unit. The storage unit stores a program code, and when the program code is executed by the processor, the processor executes the following steps: when receiving an operation request from outside the server, if an effective identity (ID) code of a worker executing the operation request is set to be a default ID code and the default ID code does not have an authority for executing the operation request, setting the effective ID code as a specific ID code, and executing the operation request through the worker having the specific ID code, wherein the specific ID code has the authority for executing the operation request; and after the operation request is executed, setting the effective ID code as the default ID code.

According to another embodiment of the present invention, a method for switching execution ID codes is provided. The method can be applied to a server, and comprises: when receiving an operation request from outside the server, under the situation that an effective ID code of a worker processing the operation request is set as a default ID code and the default ID code does not have an authority for executing the operation request, setting the effective ID code as a specific ID code and executing the operation request through the worker having the specific ID code, wherein the specific ID code has the authority for executing the operation request; and after the operation request is executed, setting the effective ID code as the default ID code.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
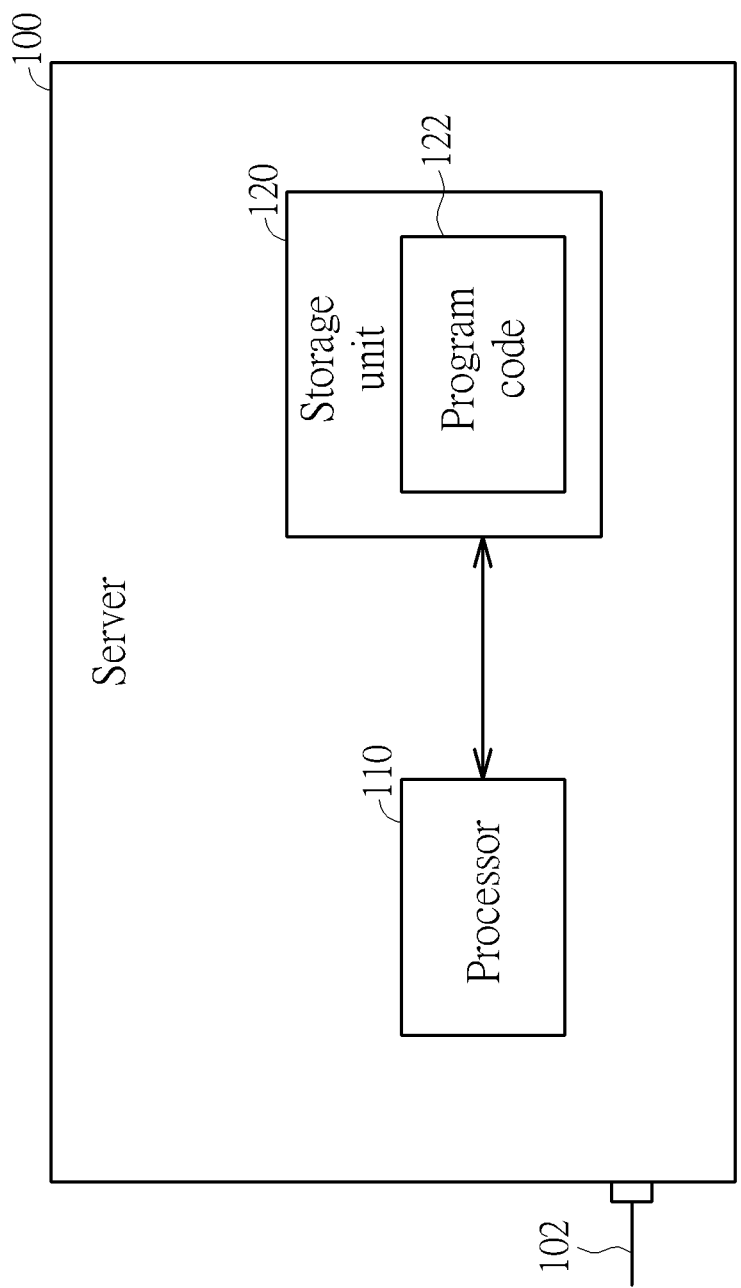
FIG. 1 is a diagram illustrating the scheme of a server according to an embodiment of the present invention.

FIG. 1 is a diagram illustrating the scheme of a server 100 according to an embodiment of the present invention. The server 100 includes the processor 110 and a storage unit 120, wherein storage unit 120 includes a program code 122, and the program code 122 may include at least a portion (e.g. part or all) of a system application. This is merely for illustrative purposes, and not meant to be limitations of the present invention. The aforementioned system application includes (but is not limited to) a web page server software (e.g. an Apache HTTPd server software), an operating system software (e.g. a web page type operating system software), and a file managing application. The server 100 is connected to the network through a network cable 102 in order to perform data transmissions with an outer electronic device. In this embodiment, the server 100 may be a multi-functional network attached storage server, which may provide various system services to users through the aforementioned system application. For example, the server 100 may receive an operation request from the user through the aforementioned file managing application in order to initiate system services such as downloading or uploading files. In another example, the server 100 may receive a Uniform Resource Locator (URL) from the user through the aforementioned web page server software (i.e. a HyperText Transfer Protocol (HTTP) request), and process the URL to provide an HTTP response to the user. The server 100 may further include other server functions.

In practice, when the processor 110 executes the system application of the program code 122, the processor 110 will assign a worker to execute the system application and process an operation request from outside the server 100, wherein the operation request relates to the system application. The settings of a profile in the system application include the execution ID code and/or the execution group of the aforementioned worker when executing the system application. The execution ID code and the execution group correspond to an effective ID code (e.g. effective user identifier, EUID code) and an effective group ID code (effective group identifier, EGID code), respectively. The processor 110 may set the effective ID code and the effective group ID code of the worker to assign corresponding operation authorities to each worker. Since one skilled in this field may readily know the definitions and operation details of the effective ID code and effective group ID code, the detailed descriptions are omitted here for brevity.

The aforementioned effective ID code comprises a root ID code, a user ID code and a dedicated service ID code, wherein the root ID code has the highest system managing authority. The user ID code corresponds to a user, and the authority of the user ID code corresponds to the authority of the user assigned by the administrator of the server 100. The dedicated service ID code corresponds to a system application, and includes the authority for executing the system application. The execution ID code set in the aforementioned profile may comprise a root ID, a user ID and a dedicated service ID, wherein the root ID corresponds to the aforementioned root ID code, the user ID corresponds to the aforementioned user ID code, and the dedicated service ID corresponds to the aforementioned dedicated service ID code. For example, the aforementioned root ID, the user ID and the dedicated service ID may be "root", "ken" and "http", respectively; and the root ID code, the user ID code and the dedicated service ID code may be 0, 2 and 3, respectively. This is merely for illustrative purposes, and not meant to be limitations of the present invention. Note that the aforementioned root ID may also be termed "administrator".

The aforementioned effective group ID code comprises a root group ID code, a user group ID code and a dedicated service group ID code. The root group ID code has the highest system management authority. The user group ID code corresponds to a user group, and the authority of the user group ID code corresponds to the authority of the user group set by the administrator of the server 100. The dedicated service ID code corresponds to a system application, and has the authority for executing the system application. The execution group set in the aforementioned profile may comprise a root group, a user group and a dedicated service group. The root group corresponds to the aforementioned root group ID code, the user group corresponds to the aforementioned user group ID code, and the dedicated service group corresponds to the aforementioned dedicated service ID code. For example, the aforementioned root group, user group, dedicated service group may be "root", "ken" and "http", respectively; and the root group ID code, user group ID code and dedicated service ID code may be set as 0, 2 and 3, respectively. This is merely for illustrative purposes, and not meant to be limitations of the present invention. Note that the aforementioned root group may also be termed "administrator group".

In this embodiment, the aforementioned effective ID code further includes a default ID code, and the effective group ID code further includes a default group ID code. The execution ID code set in the aforementioned profile further includes a default ID code, and the execution group in the aforementioned profile further includes a default group, wherein the default ID corresponds to the default ID code, and the default group corresponds to the default group ID code. For example, the aforementioned default ID code and the default group may be "system" and "system", respectively. The default ID code and the default group ID code may be set as 1 and 1, respectively.

Figure 2:
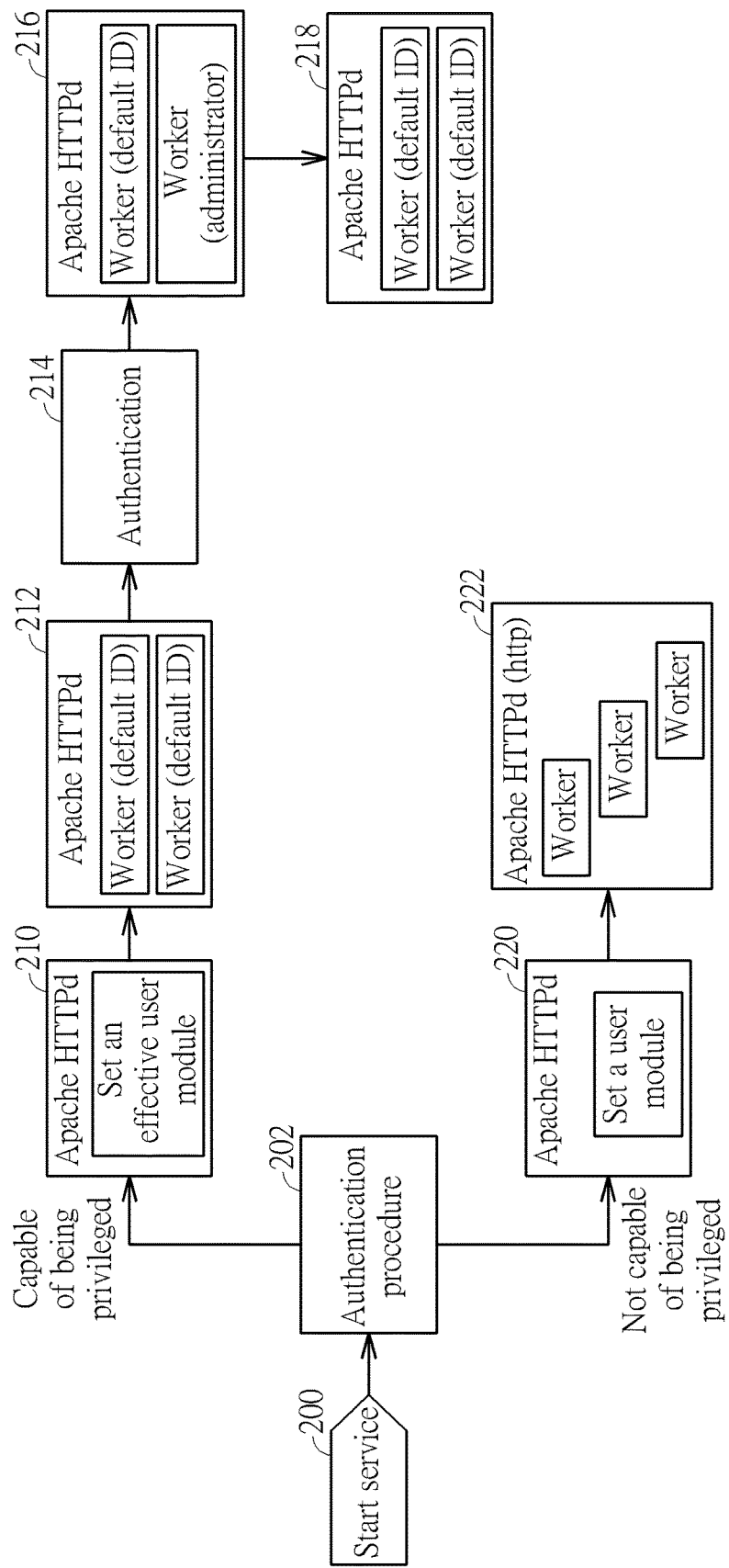
FIG. 2 is a flowchart illustrating operation of the server shown in FIG. 1 according to an embodiment of the present invention.

FIG. 2 is a flowchart illustrating an operation flow of the server 100 according to an embodiment of the present invention. In the embodiment illustrated in FIG. 2, the Apache HTTPd server software is shown as an example of the aforementioned system application, but the present invention is not limited thereto. In Step 200, the processor 110 executes the program code 122 to start or restart the Apache HTTPd server software, and the flow enters Step 202. In Step 202, the processor 110 executes an authentication procedure to determine whether the authority of a worker for processing the operation request of the Apache HTTPd server software can be privileged. Taking the Apache HTTPd server software as an example, if the execution ID code of the profile is the aforementioned default ID code, the processor 110 may determine that the worker can be privileged, and the flow enters Step 210; otherwise, if the execution ID code of the profile is the dedicated service ID code, the processor 110 may therefore determine that the worker cannot be privileged, and the flow enters Step 220.

For example, if the execution ID code within the profile "httpd.conf" of the Apache HTTPd server software includes the setting "User system", the processor 110 may determine that the authority of the worker for processing the operation request of the Apache HTTPd server software can be privileged, and then the flow enters Step 210; otherwise, if the execution ID code within the profile "httpd.conf" of the Apache HTTPd server software includes the setting "User http", the processor 110 may determine that the authority of the worker for processing the operation request of the Apache HTTPd server software cannot be privileged, and then the flow enters Step 220, wherein "system" may be an example of the aforementioned default identity and "http" may be an example of the aforementioned dedicated service ID code.

In Step 210, the processor 110 executes a setting effective user module to set the execution ID code of the aforementioned worker as the aforementioned default ID code. The processor 110 may set the effective ID code of the worker as the aforementioned default ID code (e.g. EUID code=1). It should be noted that the worker is arranged for processing an operation request of a user, i.e. the worker receives the operation request form the user. If the operation request needs to be processed through the common gateway interface (CGI), the worker will transmit the operation request to the CGI in order for the CGI to transfer the operation request to the user. Further, since the definition and operations of "worker" associated to the Apache HTTPd server software are well-known to one skilled in the art, the detailed descriptions thereof are omitted here for brevity.

In Step 212, the effective ID code of the worker for processing the operation request of the Apache HTTPd server software is set as a default ID code, but this default ID code is not the administrator ID or the user ID of the user. The authority of the worker is restricted. Further, from Step 212, the server 100 may begin to receive the operation request from outside the user.

When the server 100 receives an operation request from outside, if the default ID code of the worker for processing the operation request does not include the authority of the operation request, the flow enters an authentication procedure in Step 214; otherwise, if the default ID code of the worker for processing the operation request includes the authority of the operation request, the worker may directly use the default ID code to execute the operation request, and send back the processing result to an external user.

In Step 214, the processor 110 checks the current execution ID code again. If the current execution ID code conforms to a setting capable of promoting the authority (e.g. the aforementioned User system setting), the effective user module will be informed to set the effective ID code of the worker as the aforementioned specific ID code (e.g. EUID code=0). In this embodiment, the specific ID code may be an identification code having the authority of the user's operation request. For example, the specific ID code may be a root ID code, and this root ID code has the highest system management authority. In another embodiment, the aforementioned specific ID code may be a user ID code corresponding to the aforementioned user, and the user specific ID code has the authority for executing the user's operation request.

The root ID code and the user ID code may be set in a saved set user ID (SUID) code of the worker and a real user ID (RUID) code. The setting effective user module may selectively set the effective ID code as the root ID code according to the SUID code, or set the effective ID code as the user ID code according to the RUID code, wherein after the setting effective user module sets the effective ID code of the user as the root ID code according to the SUID code, the SUID code can be set as the default ID code.

In Step 216, the processor 110 executes the operation request through the worker of the specific ID code. The specific ID code may be the root ID code, which has the authority of the operation request. Hence, the worker has the authority to execute some operations which were previously unexecutable, such as downloading or uploading files, or operations associated with system services. In Step 216, the worker may execute the operation request from outside, and send back the processing result to an external user. In an embodiment, the aforementioned specific ID code may be a user ID code, and the user ID code may also have the authority of the operation request. In this case, the processor 110 may execute the operation request through the user ID code.

In Step 218, after executing the operation request, the processor 110 may control the setting effective user module to set the execution ID code of the worker as the default ID code, e.g. set the effective ID code of the worker as the aforementioned default ID code to demote the authority of the worker.

In Step 220, the processor 110 controls the user module to set the aforementioned execution ID of the worker as the aforementioned dedicated service ID, e.g. set the effective ID code of the worker as the aforementioned dedicated service ID code, wherein the dedicated service ID code corresponds to the aforementioned system application (the Apache HTTPd server software in this embodiment), and the worker having the dedicated service ID code cannot be privileged. In other words, the effective ID code of the worker cannot be changed to an effective ID code with a high authority, such as a root ID code or a user ID code.

Under a situation where the root ID code is set in the SUID code of the worker, and the user ID code is set in the RUID code of the worker, when the setting user module sets the effective ID code of the worker as the aforementioned dedicated service ID code, the SUID code and the RUID code of the worker may be set together as the dedicated service ID code. The setting user module therefore cannot set the effective ID code as the root ID code again according to the SUID code, or set the effective ID code as the user ID code again according to the RUID code.

Through the aforementioned operating flow of FIG. 2, if it is determined that the worker for processing the operation request of the system application can be privileged, the authority will be temporarily privileged to the administrator or the user ID code only when there is a need for executing the operation request. Further, after the operation request is completed; the execution ID code of the worker will be changed back to the default ID code. On the other hand, if it is determined that the worker for processing the operation request of the system application cannot be privileged, the execution ID code of the worker is set as the dedicated service ID code, and the worker having the dedicated service cannot be privileged. According to the aforementioned embodiments, the operation request may be processed effectively, and the system security can be fully upgraded.

Referring to FIG. 2 again, the operation flow of the server 100 according to another embodiment of the present invention will be described as follows. As shown in Step 200 of FIG. 2, when the processor 110 executes the program code 122 by enabling or restarting the aforementioned Apache HTTPd server software, the flow enters Step 202. In Step 202, the processor 110 performs an authentication procedure to determine whether the authority of the worker for processing the operation request of the Apache HTTPd server software can be privileged. Taking the Apache HTTPd server software as an example, if the execution ID code in a profile is the aforementioned default ID and the execution group in the profile is the aforementioned default group, the processor 110 may determine that the worker can be privileged, and the flow enters Step 210; otherwise, if the execution ID code in the profile is the dedicated service ID code, and the execution group in the profile is the dedicated service group, the processor 110 may determine that the worker cannot be privileged, and the flow enters Step 220.

For example, if the execution ID code and the execution group in the profile "httpd.conf" of the Apache HTTPd server software include the settings of "User system, Group system", the processor 110 may determine that the worker for processing the Apache HTTPd server software can be privileged and the flow enters Step 210; otherwise, if the execution ID code and the execution group in the profile "httpd.conf" includes the settings of "User http, Group http", the processor 110 may determine that the worker for processing the Apache HTTPd server software cannot be privileged and the flow enters Step 220, wherein the system may be an example of the aforementioned default ID code and default group, and the http may be an example of the aforementioned dedicated service ID code and the dedicated service group.

In Step 210, the processor 110 executes a setting effective user module to set the execution ID of the aforementioned worker as the aforementioned default ID. The processor 110 may set the effective ID code of the worker as the aforementioned default ID code (e.g. EUID code=1). The processor 110 may further execute a setting effective group module to set the aforementioned execution group of the worker as the aforementioned default group. The processor 110 may set the effective group ID code of the worker as the aforementioned default group ID code (e.g. EGID code=1).

In Step 212, the worker for processing the operation request of the Apache HTTPd server software has been set as the default ID code and the default group, wherein the default ID is not the administrator ID or the user ID code of the user, and the default group is not the administrator group or the user group. The authority of the worker is limited. Further, from Step 212, the server 100 may start to receive the operation request of external users.

When the server 100 receives an operation request from outside, if the default ID code and the default group ID code of the worker processing the operation request do not include the authority of the operation request, the flow enters the authentication procedure in Step 214; otherwise, if the default ID code and the default group ID code of the worker for processing the operation request include the authority of the operation request, the worker may directly use the default ID and the default group to execute the operation request, and send back the processing result to external users.

In Step 214, the processor 110 checks the current execution ID code and execution group of the worker again. If the current execution ID code and execution group of the worker conform to settings (e.g. the aforementioned settings of User system, Group system) can be privileged, the processor 110 informs the setting effective user module to set the effective ID code of the worker as the aforementioned specific ID code (e.g. EUID code=0). Meanwhile, the processor 110 further executes the setting effective group module to set the effective group ID code of the worker as the aforementioned specific group ID code (e.g. EGID code=0). In this embodiment, the aforementioned specific ID code and the specific group ID code may be ID codes having the authority of the operation request of the user, e.g. the specific ID code may be the root ID code, and the specific group ID code may be the root group ID code, wherein both the root ID code and the root group ID code have the highest system management authority. In other embodiments, the aforementioned specific ID code and specific group ID code may be the user ID code and the user group ID code, respectively, wherein the user ID code corresponds to the aforementioned user, the user group ID code corresponds to the aforementioned user group, and the user ID code and the user group ID code have the authority of the operation request of the user.

The root ID code and the user ID code may be set in the SUID code and RUID code of the worker, respectively, and the root group ID code and the user group ID code may be set in a saved set-group-id (SGID) code and a real-group-id (RGID) code of the user, respectively. The setting effective user module may selectively refer to the SUID code to set the effective ID code as the root ID code, or refer to the RGID code to set the effective ID code as the user ID code, wherein after the setting effective user module refers to the SUID code to set the effective ID code as the root ID code, the SUID code can be set as the default ID code. The setting effective group module may selectively refer to the SGID code to set the effective group ID code as the root group ID code, or refer to the RGID code to set the effective group ID code as the user group ID code, wherein when the setting effective group module refers to the SGID code to set the effective group ID code as the root group ID code, the SGID code can be set as the default group ID code.

In Step 216, the processor 110 executes the operation request through the worker having the specific ID code and the specific group ID code. The specific ID code and the specific group ID code may be the root ID code and the root group ID code, respectively, wherein the root ID code and the root group ID code have the authority of the operation request. Hence, the worker may have the authority to execute operations which were previously unexecutable, such as downloading and uploading, or other operations associated with system services. In this way, the worker may execute the operation request from outside in Step 216, and send back processing results to external users. In an embodiment, the specific ID code and the specific group ID code may be the aforementioned user ID code and the user group ID code, respectively, and the user ID code and user group ID code also have the authority of the operation request. Hence, the processor 110 may execute the operation request through the user ID code and the user group ID code of the worker.

In Step 218, after executing the operation request, the processor 110 informs the setting effective user module again to set the execution ID code of the worker as the default ID code, and informs the setting effective group module to set the execution group of the worker to the default group, in order to de-privilege the operating authority of the worker.

In Step 220, the processor 110 informs the setting user module to set the aforementioned execution ID of the worker as the aforementioned dedicated service ID (i.e. set the effective ID code of the worker as the aforementioned dedicated service ID code). Meanwhile, the processor 110 also informs the setting group module to set the aforementioned execution group of the worker as the aforementioned dedicated service group (i.e. set the effective group ID code of the worker as the aforementioned dedicated service group ID code, wherein the dedicated service ID code and dedicated service ID code correspond to the aforementioned system application (the Apache HTTPd server software in this embodiment), which has an authority incapable of being privileged by the worker having the dedicated service ID code and the dedicated service ID code. For example, the effective ID code of the worker cannot be changed to the effective ID code codes with higher authority, such as a root ID code or a user ID code, and the effective group ID code of the worker cannot be changed to the effective ID code codes with higher authority such as the root group ID code or the user group ID code.

Under the situation where the root group ID code and the user group ID code are set in the SGID code and the RGID code of the worker, the setting user module may set the effective group ID code of the worker as the aforementioned dedicated service ID code, and may set the SGID code and RGID code of the worker as the dedicated service ID code, concurrently. In this way, the setting user module can no longer set the effective group ID code as the root group ID code according to the SGID code, or set the effective group ID code as the user group ID code according to the RGID code.

In practice, the aforementioned setting user module may be implemented with the setuid( ) software module of a Unix-like operating system; the aforementioned setting effective user module may be implemented with the seteuid software module of a Unix-like operating system; the aforementioned setting group module may be implemented with the setgid( ) software module of a Unix-like operating system; and the aforementioned effective group module may be implemented with the setegid software module of a Unix-like operating system.

To briefly summarize, the method for switching identities and the related server of the present invention may temporarily privilege the authority only when necessary. After the operation request is finished, the identity may be switched back to the default identity. Hence, the present invention may effectively process operation requests, and fully raise system security.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A server comprising a processor and a storage unit, wherein the storage unit stores a program code, and when the program code is executed by the processor, the processor executes the following steps:
    when receiving an operation request from outside the server, if an effective identity (ID) of a worker executing the operation request is set to be a default ID and the default ID does not have an authority for executing the operation request, setting the effective ID as a specific ID, and executing the operation request through the worker having the specific ID, wherein the specific ID has the authority for executing the operation request; and
    after the operation request is executed, setting the effective ID as the default ID;
    wherein when the program code is executed by the processor, the processor further executes the following steps:
        when the server starts or restarts a system application, determine whether the worker can be privileged according to a profile of the system application;
        if the worker can be privileged, setting the effective ID as the default ID; and
        if the worker cannot be privileged, setting the effective ID as a dedicated service ID, wherein the dedicated service ID has an authority for executing the system application, and the worker having the dedicated service ID cannot be privileged.

2. The server of claim 1, wherein the specific ID is a root ID, and the root ID includes a highest system management authority.

3. The server of claim 1, wherein the specific ID is a user ID, and the user ID corresponds to a user and includes the authority for executing the operation request.

4. The server of claim 1, wherein when the processor executes the program code, and the server starts or restarts the system application, the step of determining whether the worker can be privileged according to the profile of the system application further comprises:
   if the worker can be privileged, setting an effective group ID as a default group ID, wherein the default group ID has the authority for executing the operation request; and
   if the worker cannot be privileged, setting the effective group ID as a dedicated service group ID, wherein the dedicated service group ID corresponds to the system application, and the worker having the dedicated service group ID cannot be privileged.

5. The server of claim 1, wherein when the processor executes the program code, and receives the operation request from outside the server, under a situation that the effective ID of the worker is set as the default ID, if the default ID does not have the authority for executing the operation request, the step of setting the effective ID as the specific ID further comprises:
   under a situation that an effective group ID of the worker processing the operation request is set as a default group ID and the default group ID does not have an authority for executing the operation request, setting the effective group ID as a specific group ID, wherein the processor further executes the following steps:
      executing the operation request through the worker having the specific group ID, wherein the specific group ID has an authority for executing the operation request; and
      after executing the operation request, setting the effective group ID of the worker as the default group ID.

6. The server of claim 5, wherein the specific group ID is a root group ID, wherein the root group ID includes a highest system management authority.

7. The server of claim 5, wherein the specific group ID is a user group ID, and the user group ID corresponds to a user and includes the authority for executing the operation request.

8. A method for switching execution identity (ID), the method applied to a server, and comprising:
   when receiving an operation request from outside the server, under a situation that an effective ID of a worker processing the operation request is set as a default ID and the default ID does not have an authority for executing the operation request, setting the effective ID as a specific ID and executing the operation request through the worker having the specific ID, wherein the specific ID has the authority for executing the operation request; after the operation request is executed, setting the effective ID as the default ID;
   when the server starts or restarts a system application, determining whether the worker can be privileged according to a profile of the system application;
   if the worker can be privileged, setting the effective ID as the default ID; and
   if the worker cannot be privileged, setting the effective ID as a dedicated service ID, wherein the dedicated service ID has an authority for executing the system application, and the worker having the dedicated service ID cannot be privileged.

9. The method of claim 8, wherein the specific ID is a root ID, wherein the root ID includes a highest system management authority.

10. The method of claim 8, wherein the specific ID is a user ID, and the user ID corresponds to a user and includes the authority for executing the operation request.

11. The method of claim 8, wherein when the server starts or restarts the system application, the step of determining whether the worker can be privileged according to the profile of the system application further comprises:
   if the worker can be privileged, setting an effective group of the worker as a default group ID, wherein the default group ID includes the authority for executing the operation request; and
   if the worker cannot be privileged, setting the effective group ID as a dedicated service ID, wherein the dedicated service ID corresponds to the system application, and the worker having the dedicated service ID cannot be privileged.

12. The method of claim 8, wherein when receiving the operation request from outside the server, under a situation that the effective ID of the worker processing the operation request is set as the default ID, if the default ID does not include the authority for executing the operation request, the step of setting the effective ID as the specific ID further comprises:
   under a situation that an effective group ID of the worker processing the operation request is set as a default group ID and the default group ID does not have the authority for executing the operation request, setting the effective group ID as a specific group ID, wherein the processor further executes the following steps:
      executing the operation request through the worker having the specific group ID, wherein the specific group ID has the authority for executing the operation request; and
      after the operation request is executed, setting the effective group ID of the worker as the default group ID.

13. The method of claim 12, wherein the specific group ID is a root group ID, wherein the root group ID includes a highest system management authority.

14. The method of claim 12, wherein the specific group ID is a user group ID, and the user group ID corresponds to a user and has the authority for executing the operation request.

* * * * *